US011884075B2

(12) United States Patent
Kim et al.

(10) Patent No.: US 11,884,075 B2
(45) Date of Patent: Jan. 30, 2024

(54) INKJET HEAD CLEANING APPARATUS AND INKJET PRINTING EQUIPMENT INCLUDING SAME

(71) Applicant: SEMES CO., LTD., Cheonan-si (KR)

(72) Inventors: Sung Ho Kim, Cheonan-si (KR); Gyeong Seok Hwang, Anyang-si (KR)

(73) Assignee: SEMES CO., LTD., Cheonan-si (KR)

( * ) Notice: Subject to any disclaimer, the term of this patent is extended or adjusted under 35 U.S.C. 154(b) by 81 days.

(21) Appl. No.: 17/714,987

(22) Filed: Apr. 6, 2022

(65) Prior Publication Data

US 2022/0324234 A1 Oct. 13, 2022

(30) Foreign Application Priority Data

Apr. 12, 2021 (KR) ........................ 10-2021-0047320

(51) Int. Cl.
*B41J 2/165* (2006.01)
*B41J 29/17* (2006.01)

(52) U.S. Cl.
CPC ........... *B41J 2/16538* (2013.01); *B41J 29/17* (2013.01)

(58) Field of Classification Search
CPC .... B41J 2/16538; B41J 29/17; B41J 2/16544; B41J 2002/16558; B41J 2/16552
See application file for complete search history.

(56) References Cited

U.S. PATENT DOCUMENTS

| | | | | |
|---|---|---|---|---|
| 5,048,712 | A * | 9/1991 | Wolters | B65F 1/163 220/908 |
| 5,864,348 | A | 1/1999 | Fritsch | |
| 2004/0001116 | A1* | 1/2004 | Wouters | B41J 2/16552 347/30 |
| 2015/0336388 | A1 | 11/2015 | Ohnishi | |

FOREIGN PATENT DOCUMENTS

| | | | |
|---|---|---|---|
| CN | 103128087 | A * | 6/2013 |
| CN | 206824345 | U * | 1/2018 |
| JP | 5330074 | | 12/1993 |
| JP | 2014-069351 | | 4/2014 |
| JP | 2018-022594 | | 2/2018 |

OTHER PUBLICATIONS

Office Action from the Korean Intellectual Property Office dated Jul. 14, 2023.

Office Action from the China National Intellectual Property Administration dated Oct. 1, 2023.

* cited by examiner

*Primary Examiner* — Sharon Polk

(57) ABSTRACT

A nozzle cleaning apparatus includes a body part, a brush part formed on a first surface of the body part and having a size such that the brush part is inserted into a nozzle to remove foreign substances, and a drive unit for lifting the body part so that the brush part is inserted into the nozzle.

20 Claims, 23 Drawing Sheets

INKJET HEAD CLEANING APPARATUS AND INKJET PRINTING EQUIPMENT INCLUDING SAME

CROSS REFERENCE TO RELATED APPLICATION

The present application claims priority to Korean Patent Application No. 10-2021-0047320, filed Apr. 12, 2021, the entire contents of which are incorporated by reference herein for all purposes.

BACKGROUND OF THE INVENTION

Field of the Invention

The present disclosure relates to an inkjet head cleaning apparatus and inkjet printing equipment including the same and, more particularly, to an inkjet head cleaning apparatus capable of removing foreign substances inside a nozzle of an inkjet head, and inkjet printing equipment including the same.

Description of the Related Art

As a display panel that is a means for conveying visual information to a user, display panels such as liquid crystal display (LCD), plasma display panel (PDP), and organic light emitting display (OLED) are being used.

In order to manufacture such a display panel, an inkjet printing has been introduced as a technique for forming a specific pattern on a substrate (e.g., glass). Inkjet printing is a method of dispensing a liquid according to a pattern to be formed onto a substrate and then the substrate is cured through heat treatment. Inkjet printing has the advantage of being able to form a desired pattern in a quick and simple way.

On the other hand, in inkjet printing equipment, liquid droplets are discharged through an inkjet head, and as the droplets are repeatedly discharged, foreign substances (droplets and particles) may be generated around a nozzle of the inkjet head. When these foreign substances are not removed properly and accumulate inside the nozzles of the inkjet head, the discharge amount or discharge pressure of the droplets varies from nozzle to nozzle, which may cause discharge failure. Accordingly, a technique for effectively cleaning the inkjet head is required.

SUMMARY OF THE INVENTION

Accordingly, the present disclosure has been made keeping in mind the above problems occurring in the related art, and the present disclosure is intended to provide an inkjet head cleaning apparatus capable of removing foreign substances inside a nozzle of an inkjet head and inkjet printing equipment including the same.

The objectives of the present disclosure are not limited to those mentioned above, and other objectives not mentioned will be clearly understood by those skilled in the art from the following description.

According to an embodiment of the present invention, a nozzle cleaning apparatus may include: a body part; a brush part formed on a first surface of the body part and having a size such that the brush part is inserted into a nozzle to remove foreign substances; and a drive unit for lifting the body part so that the brush part is inserted into the nozzle.

According to an embodiment of present invention, an inkjet head cleaning apparatus may include: a body part having a shape corresponding to an inkjet head in which a nozzle for discharging a liquid is formed; a brush part formed on a first surface of the body part and having a size such that the brush part is inserted into the nozzle to remove foreign substances; a brush cleaning unit that cleans the brush part using a cleaning solution; a brush drying unit for drying the cleaning solution remaining on the brush part; and a drive unit for lifting the body part so that the dried brush part is inserted into the nozzle.

According to an embodiment of present invention, inkjet printing equipment includes: a stage that forms a space where a substrate is treated; a gripper positioned on a side of the stage and configured to move in a first direction while gripping the side of the substrate; a gantry provided on an upper part of the stage; an inkjet head caused to move in a second direction perpendicular to the first direction in the gantry and discharging droplets toward the substrate; and an inkjet head cleaning apparatus positioned at a first side of the stage to clean the inkjet head. The inkjet head cleaning apparatus may include: a body part having a shape corresponding to the inkjet head; a brush part formed on a first surface of the body part and having a size such that the brush part is inserted into a nozzle to remove foreign substances; a brush cleaning unit that cleans the brush part using a cleaning solution; and a drive unit for lifting the body part so that the brush part is inserted into the nozzle.

According to an embodiment of the present invention, a method for cleaning an inkjet head may include: adjusting the surface polarity of a brush part of a cleaning member; moving the cleaning member to be located under the inkjet head; lifting the cleaning member so that the brush part of the cleaning member is inserted into a nozzle of the inkjet head; and lowering the cleaning in response to cleaning of the inkjet head being completed.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
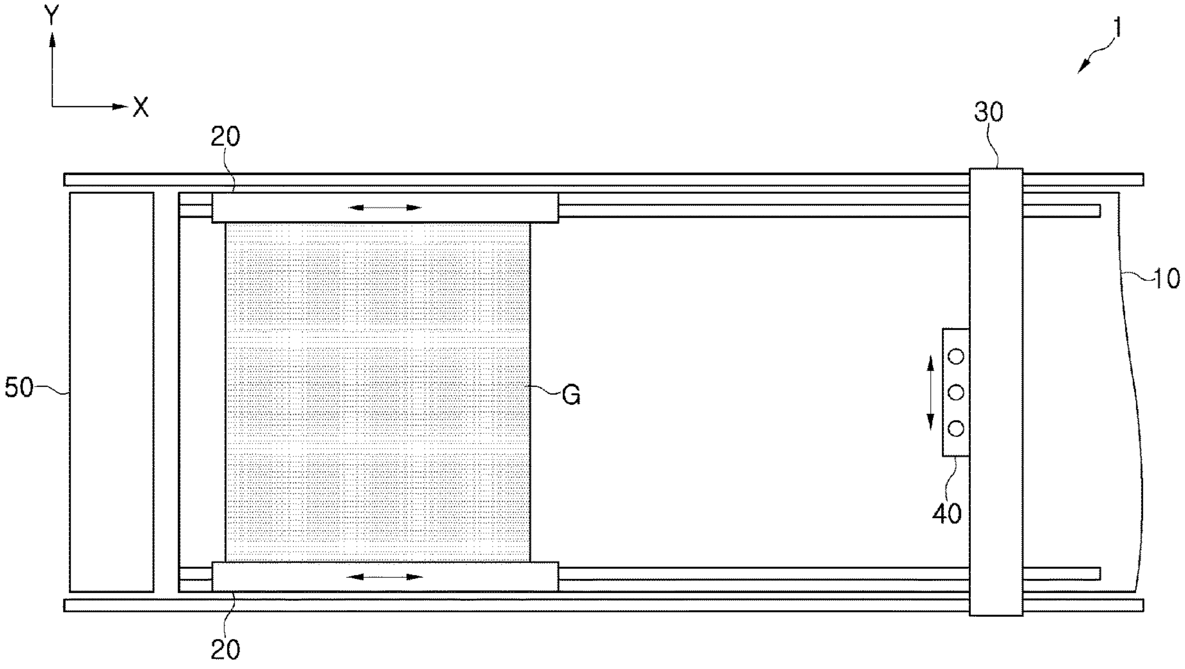
FIG. 1 shows a schematic structure of inkjet printing equipment.

Hereinafter, with reference to the accompanying drawings, embodiments of the present disclosure will be described in detail so that those of ordinary skill in the art can easily carry out the present disclosure. The present disclosure may be embodied in many different forms and is not limited to the embodiments described herein.

In order to clearly explain the present disclosure, parts irrelevant to the description are omitted, and the same reference numerals are given to the same or similar elements throughout the specification.

In addition, in various embodiments, components having the same configuration will be described only in the representative embodiment using the same reference numerals, and only configurations different from the representative embodiment will be described in other embodiments.

Throughout the specification, when a part is said to be "connected (or coupled)" with another part, this includes not only the case of "directly connected (or coupled)" but also the case of "indirectly connected (or coupled)" with another member therebetween. In addition, when a part "includes" a certain component, it means that other components may be further included, rather than excluding other components, unless otherwise stated.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having a meaning consistent with the meaning in the context of the related art, unless explicitly defined in this application, it should not be construed in an ideal or overly formal sense.

FIG. 1 shows a schematic structure of inkjet printing equipment 1. The inkjet printing equipment 1 refers to equipment for discharging droplets on a substrate G to form a pattern on the substrate G.

The inkjet printing equipment 1 according to an embodiment of the present disclosure includes: a stage 10 that forms a space where a substrate G is treated; a gripper 20 positioned on the side of the stage 10 and configured to move in the first direction x while gripping the side of the substrate G; a gantry 30 provided on the upper part of the stage 10; an inkjet head 40 capable of moving in the second direction y perpendicular to the first direction x in the gantry 30 and discharging droplets toward the substrate G; and an inkjet head cleaning apparatus 50 positioned on one side of the stage 10 to clean the inkjet head 40.

The substrate G carried into the inkjet printing equipment 1 is transferred to the upper part of the stage 10 by a transfer robot, and the gripper 20 may move along the first direction x while gripping the side of the substrate G. The substrate G is moved to the lower part of the inkjet head 40 by the gripper 20, and the inkjet head 40 may discharge droplets on the substrate G to form a pattern on the substrate G. The inkjet head 40 discharges droplets on the substrate G while moving along the second direction y, and the gripper 20 moves along the first direction x, and droplets are discharged to each area of the substrate G.

Additionally, maintenance equipment for maintaining/repairing each device provided in the inkjet printing equipment 1 is provided. As the maintenance equipment, an inkjet head cleaning apparatus 50 for cleaning the inkjet head 40 may be provided together with an inspection device for inspecting the inkjet head 40. The inkjet head cleaning apparatus 50 may clean the inkjet head 40 for a certain period of time or every number of operations, and for cleaning the inkjet head 40, the gantry 30 on which the inkjet head 40 is installed may be configured to move to a maintenance area.

For example, as shown in FIG. 1, the inkjet head cleaning apparatus 50 is provided on one side of the stage 10, and when cleaning of the inkjet head 40 is required, the gantry 30 moves to the inkjet head cleaning apparatus 50 along the first direction x axis to perform cleaning of the inkjet head 40. Hereinafter, the configuration and operation of the inkjet head cleaning apparatus 50 for cleaning the inkjet head 40 will be described in detail. Although this document will mainly describe the case of cleaning the inkjet head 40, the present disclosure is not limited thereto and may be applied to various types of nozzles.

As a method of cleaning the inkjet head 40, the method of cleaning with a general nonwoven fabric-based cloth moving in the vertical and horizontal directions of the inkjet head 40 may be considered. However, nonwoven fabric-based cloth is a consumable part, and as time goes by, the cost of replacing consumables may increase. In addition, the operation of the equipment is stopped for replacing consumable parts, and the clean environment in the equipment may not be maintained. Further, the surface of the inkjet head may be damaged due to friction generated while the nonwoven fabric-based cloth comes into contact with the inkjet head 40.

Moreover, in the case of cleaning method using a nonwoven fabric-based cloth, only the surface of the inkjet head 40 can be cleaned, and the inside of the nozzle 42 of the inkjet head 40 is not cleaned. As such, when droplets and particles are accumulated inside the nozzle 42, discharge characteristics (e.g., discharge amount, discharge pressure) vary for each nozzle 42, which causes defects in the process. Accordingly, the present disclosure provides an inkjet head cleaning apparatus 50 capable of effectively removing foreign substances inside the nozzle 42.

Figure 2:
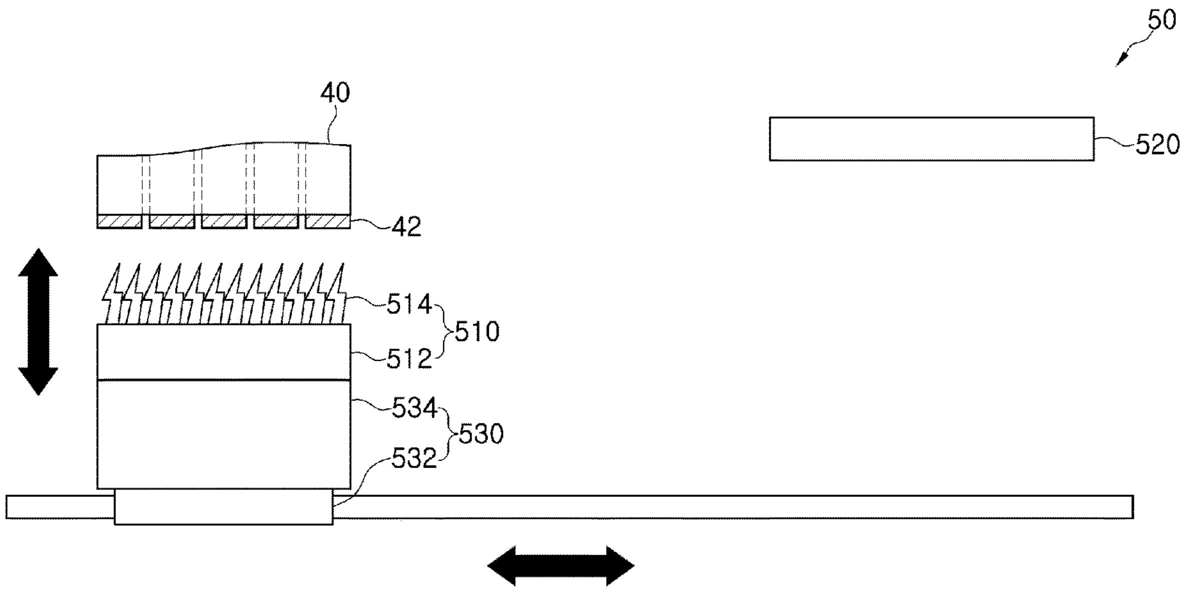
FIG. 2 shows a schematic structure of an inkjet head cleaning apparatus according to an embodiment of the present disclosure.

FIG. 2 shows a schematic structure of an inkjet head cleaning apparatus 50 according to an embodiment of the present disclosure.

The inkjet head cleaning apparatus 50 according to the embodiment of the present disclosure includes: a body part 512 provided in a certain shape; a brush part 514 formed on one surface of the body part 512 and inserted into a nozzle 42 to remove foreign substances; and a drive unit 530 for lifting the body part 512 so that the brush part 514 is inserted into the nozzle 42. The body part 512 and the brush part 514 constitute a cleaning member 510.

According to the present disclosure, since the cleaning member 510 has microstructures that can be inserted into the nozzle 42, even foreign substances present in the nozzle 42 of the inkjet head 40 may be removed.

The body part 512 may be provided in a shape corresponding to the inkjet head 40. For example, when the (width×length) area of the surface on which the nozzle 42 is formed in the inkjet head 40 is 10 cm×10 cm, the area of the body part 512 may be 10 cm×10 cm or more.

According to the present disclosure, the brush part 514 is composed of a plurality of microstructures, an area of the microstructure is smaller than a surface area of the nozzle 42, and the height of the microstructure is greater than the height of the nozzle 42. For example, when the diameter of the nozzle 42 is 100 μm, and the height of the nozzle 42 is 500 μm, the microstructure of the brush part 514 may have a diameter of 10 μm or less and a height of 1 mm. The size of the microstructure constituting the brush part 514 may be determined according to the size of the nozzle 42.

The brush part 514 is composed of the microstructures, each of which is thinner and longer than the nozzle 42, and the microstructures are inserted into the nozzle 42 to remove foreign substances (e.g., liquid, particles) remaining inside the nozzle 42. Specifically, the liquid remaining inside the nozzle 42 flows into the microstructures by the capillary force, and particles may be attached to the microstructures by an electrical force to be described later. In addition, particles may be removed by physical force caused by the microstructures. The microstructure constituting the brush part 514 may be made of a material such as Teflon, nylon, or polyester.

The surface treatment unit 520 may adjust the surface polarity of the brush part 511 by charging ions to the brush part 511 of the cleaning member 510. The surface treatment unit 520 may effectively clean the inkjet head 40 by variably adjusting the surface polarity of the cleaning member 510 according to the contamination state of the inkjet head 40.

The inkjet head cleaning apparatus 50 according to the present disclosure penetrates into the nozzle and removes only foreign substances, thus, friction applied to the inkjet head 40 is low and the lifespan of the inkjet head 40 may be increased. In addition, compared to the case of using non-woven fabric-based cloth, there is no need to replace consumables and the replacement cycle is very long, which can reduce costs and equipment downtime.

According to the embodiment of the present disclosure, the cleaning member 510 includes a body part 512 coupled to the drive unit 530 to move, and a brush part 514 coupled to one surface of the body part 512 and in which the microstructures that may be inserted into the nozzle 42 are formed. As shown in FIG. 2, the body part 512 is coupled to the drive unit 530 to move in the horizontal and vertical directions, and brush part 514 may be inserted into the nozzle 42 to separate foreign substances existing in the nozzle 42 from the nozzle 42.

According to the embodiment of the present disclosure, drive unit 530 may include: a horizontal drive unit 532 for moving the cleaning member 510 between the surface treatment unit 520 and the inkjet head 40; and a vertical drive unit 534 for lifting the body part 512 so that the brush part 514 is inserted to an end inside of the nozzle 42. The horizontal drive unit 532 is configured to be movable along a predetermined path and moves the cleaning member 510 in a horizontal direction while moving along the path. The vertical drive unit 534 may allow the cleaning member 510 to be in contact with the inkjet head 40 and then to be spaced apart from the inkjet head 40 by lifting or lowering of the cleaning member 510. In addition, a device for facilitating vibration or horizontal reciprocation while the brush part 514 of the cleaning member 510 is inserted into the nozzle 42 may be included in the drive unit 530 so that the cleaning member 510 can effectively remove foreign substances.

The lifting height of the body part 512 by the vertical drive unit 534 may be adjusted so that the brush part 514 can be inserted into the nozzle 42. For example, a height at which the brush part 514 is completely inserted into the nozzle 42 is preset, and the vertical drive unit 534 may lift the body part 512 by the preset height. In addition, a distance sensor is provided in the body part 512 so that the vertical drive unit 534 stops the lifting of the body part 512 when the distance between the body part 512 and the nozzle 42 is less than or equal to a reference value. Further, the vertical drive unit 534 may stop the lifting of the body part 512 when the load applied for lifting is greater than or equal to a certain level so that the lifting can be stopped when the brush part 514 touches the wall of the nozzle 42.

Figure 3:
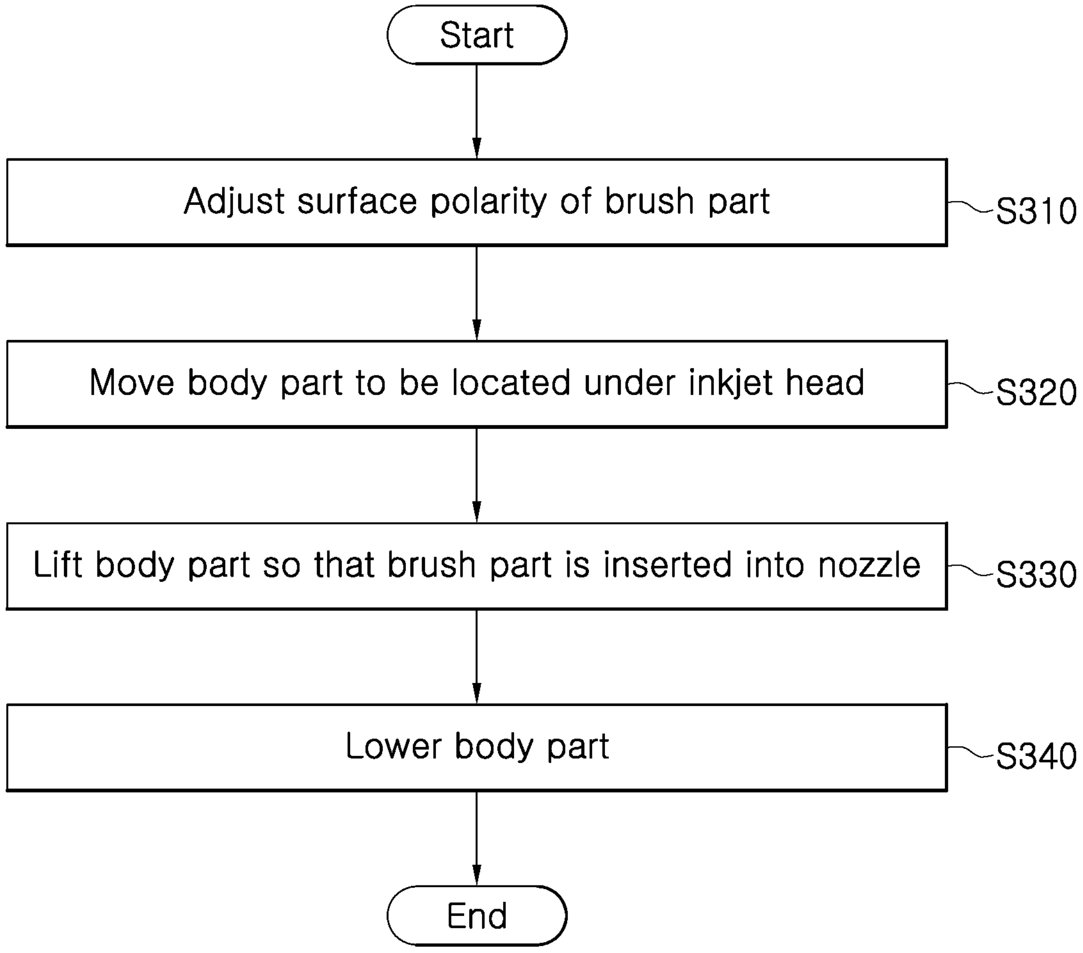
FIG. 3 is a flowchart illustrating an operation for cleaning an inkjet head according to the embodiment of the present disclosure.

FIG. 3 is a flowchart illustrating an operation for cleaning an inkjet head according to an embodiment of the present disclosure.

A method for cleaning an inkjet head according to an embodiment of the present disclosure includes: adjusting 5310 the surface polarity of the brush part 514 by using the surface treatment unit 520; moving 5320 the cleaning member 510 (body part 512) to be located under the inkjet head 40; lifting 5330 the cleaning member 510 (the body part 512) so that the brush part 514 is inserted into the nozzle 42 to clean the inkjet head 40; and lowering 5340 the cleaning member 510 (the body part 512) to release the contact when cleaning is completed. Hereinafter, a detailed operation of the inkjet head cleaning apparatus 50 according to an embodiment of the present disclosure will be described.

Figure 4:
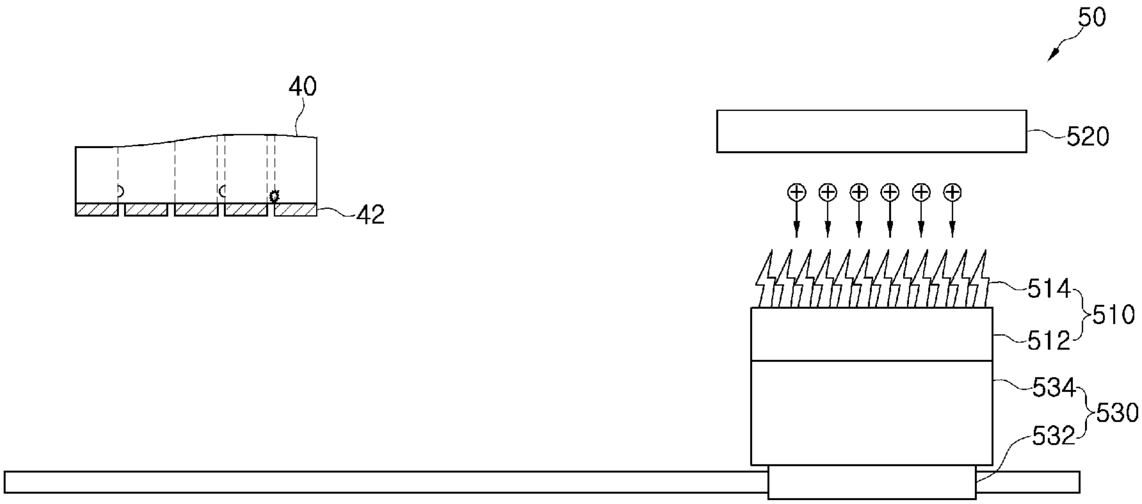
FIGS. 4 to 8 schematically show a cleaning operation by the inkjet head cleaning apparatus according to the embodiment of the present disclosure.
Figure 5:
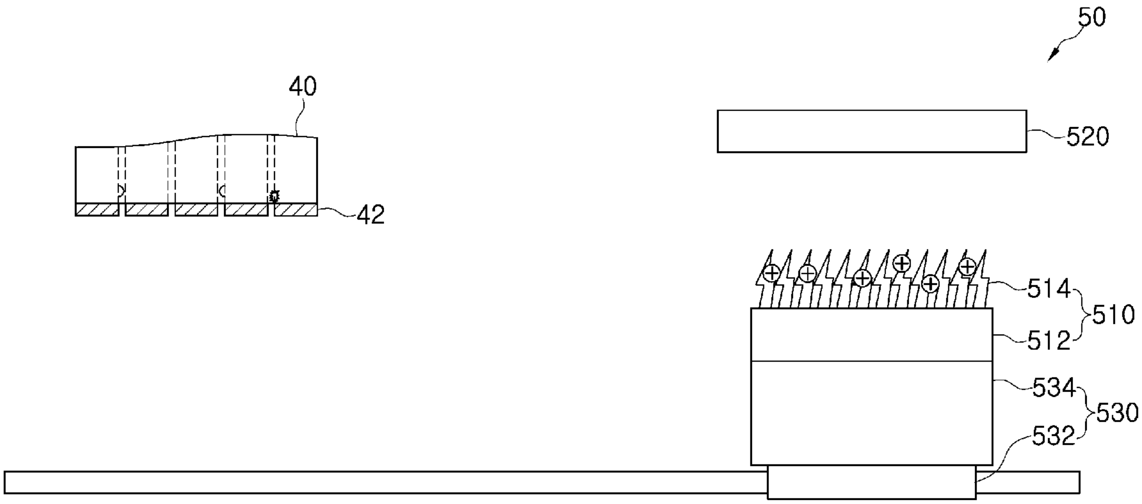

According to the embodiment of the present disclosure, the adjusting 5310 the surface polarity of the brush part 514 may include the step of charging ions to the brush part 514 through plasma treatment. As shown in FIGS. 4 and 5, the body part 512 moves to the surface treatment unit 520, and the surface treatment unit 520 charges the brush part 514 with ions to adjust the surface polarity of the brush part 514. For example, the surface treatment unit 520 may adjust the surface polarity of the cleaning member 510 by charging ions to the surface of the brush part 514 through plasma treatment.

Figure 9:
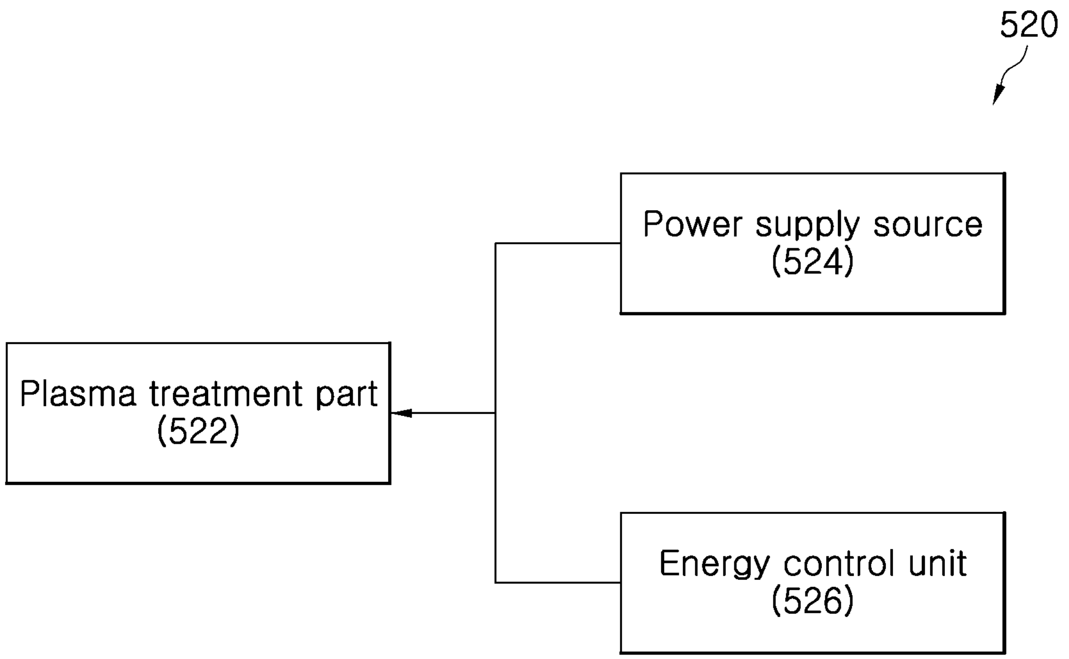
FIG. 9 is a block diagram showing a schematic configuration of a surface treatment unit according to the present disclosure.

As shown in FIG. 9, the surface treatment unit 520 according to the embodiment of the present disclosure may include: a plasma treatment part 522 that applies plasma to the brush part 514; a power supply source 524 supplying power for generating the plasma; and an energy control unit 526 for controlling plasma energy applied to the brush part 514.

Figure 21:
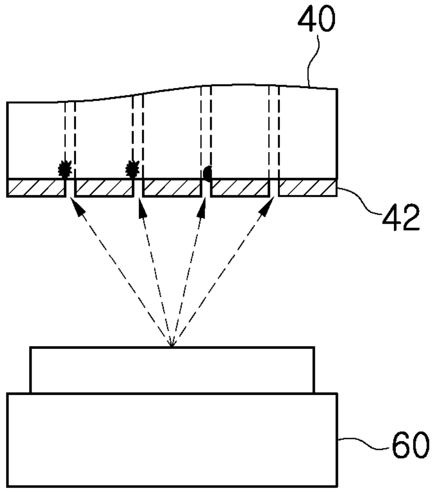
FIG. 21 shows an example of a method of inspecting an inkjet head.

Meanwhile, the step of adjusting 5310 the surface polarity of a brush part 514 may include: monitoring a contamination state of the inkjet head 40; and adjusting the surface polarity of the brush part 514 to be hydrophilic when an amount of foreign substances present in the inkjet head 49 exceeds a reference value. That is, after monitoring a contamination state of the inkjet head 40, when the contamination of the inkjet head 40 exceeds the reference value, the inkjet head 40 is cleaned to prevent a discharge defect due to the contamination of the inkjet head 40. Monitoring of the contamination state of the inkjet head 40 may be performed by photographing the nozzle 42 of the inkjet head 40 as shown in FIG. 21 to be described later, or by photographing the droplets ejected by the inkjet head 40.

The plasma treatment part 522 charges ions on the surface of the brush part 514 through plasma treatment. Preferably, the plasma treatment part 522 may charge the cleaning member 510 with ions by generating plasma in an atmospheric pressure environment. The power supply source 524 supplies power for generating plasma in the plasma treatment part 522, and the energy control unit 526 may control the amount of ion charge applied to the brush part 514 by adjusting the plasma generated by the plasma treatment part 522.

According to the present disclosure, the step of adjusting the surface polarity of the brush part 514 to be hydrophilic may include: adjusting the surface polarity of the brush part 514 based on the contamination state of the inkjet head 40. That is, when foreign substances exist in the inkjet head 40 above the reference value, by charging a larger amount of ions to the brush part 514, the surface polarity of the brush part 514 may be adjusted to be strongly hydrophilic. By variably adjusting the surface polarity of the brush part 514 according to the degree of contamination of the inkjet head 40, cleaning efficiency may be increase.

The surface characteristics of the brush part 514 may be adjusted by the energy control unit 526. For example, the energy control unit 526 may adjust the surface of the brush part 514 from weakly hydrophilic to strongly hydrophilic. The energy control unit 526 may adjust the surface characteristics of the cleaning member 510 according to the contamination level or the droplet type of the inkjet head 40 based on experimental data.

Figure 6:
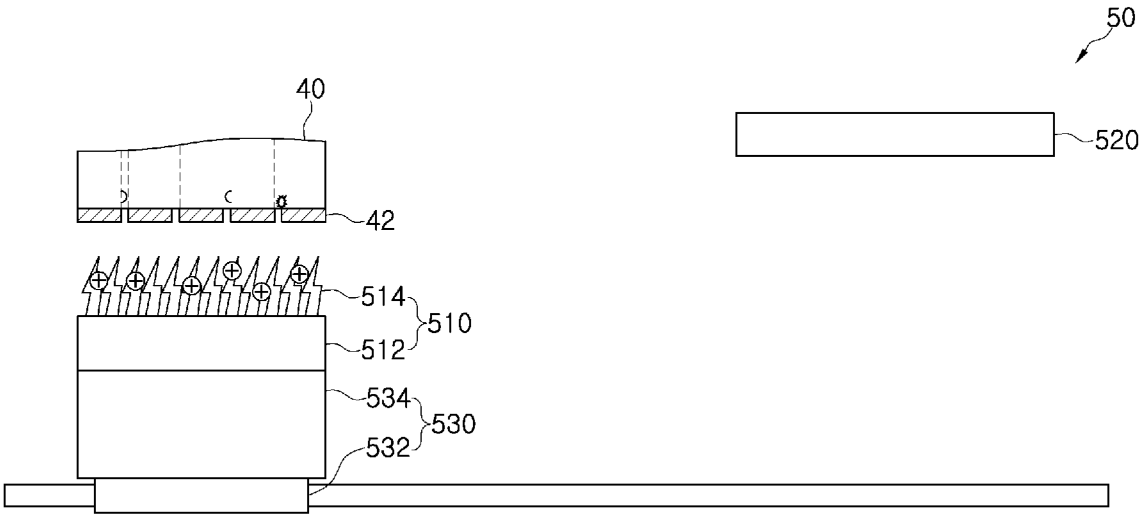
Figure 7:
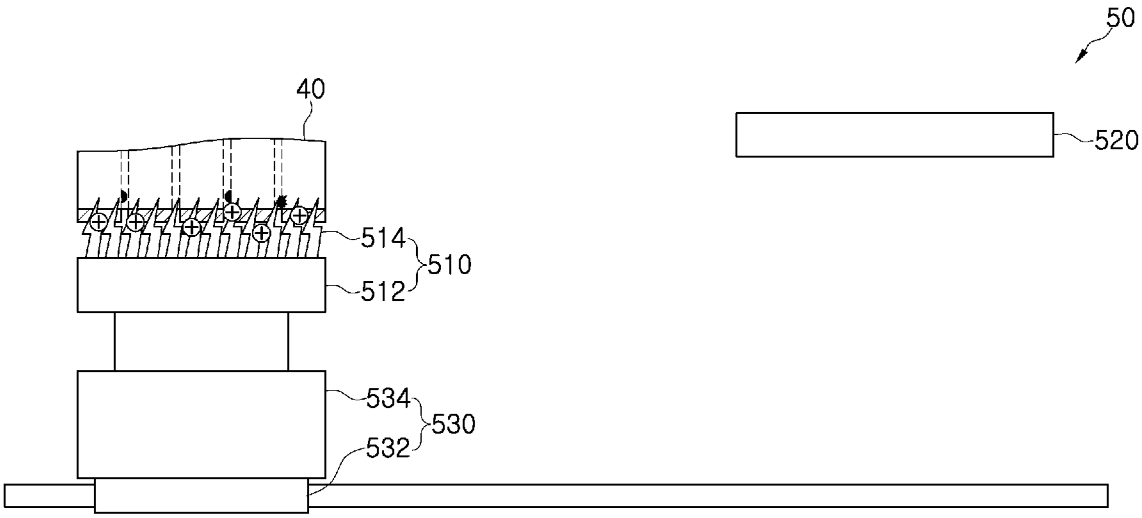

Thereafter, as shown in FIG. 6, the body part 512 moves to the lower portion of the inkjet head 40 by the horizontal drive unit 532, and as shown in FIG. 7, the cleaning member 510 is lifted by the vertical drive unit 534 and the brush part 514 is inserted into the nozzle 42. Since the brush part 514 of the cleaning member 510 is formed of microstructures that can penetrate into the inside of the nozzle 42, the brush part 514 comes into contact with foreign substances existing inside the nozzle 42.

Figure 10:
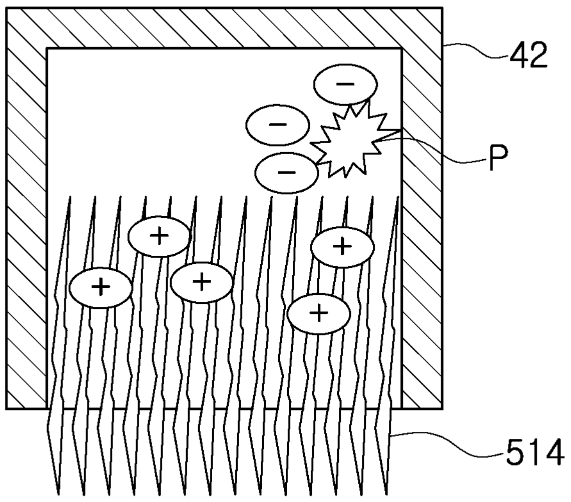
FIG. 10 is a view for explaining a mechanism in which foreign substances in a nozzle are removed by a cleaning member according to the present disclosure.

Referring to FIG. 10, in the cleaning member 510, ions are charged to the brush part 514 on which the microstructures are formed, so that the brush part 514 has a polarity greater than or equal to a certain level and has hydrophilicity. The inside and the surface of the nozzle 42 are coated with a hydrophobic, and the particles P remaining inside the nozzle 42 generally have a polarity so they are easily attached to the brush part 514. Thus, foreign substances in the nozzle 42 are attached to the brush part 514 of the cleaning member 510 penetrating into the nozzle 42, and the foreign substances can be effectively removed from the nozzle 42.

Figure 8:
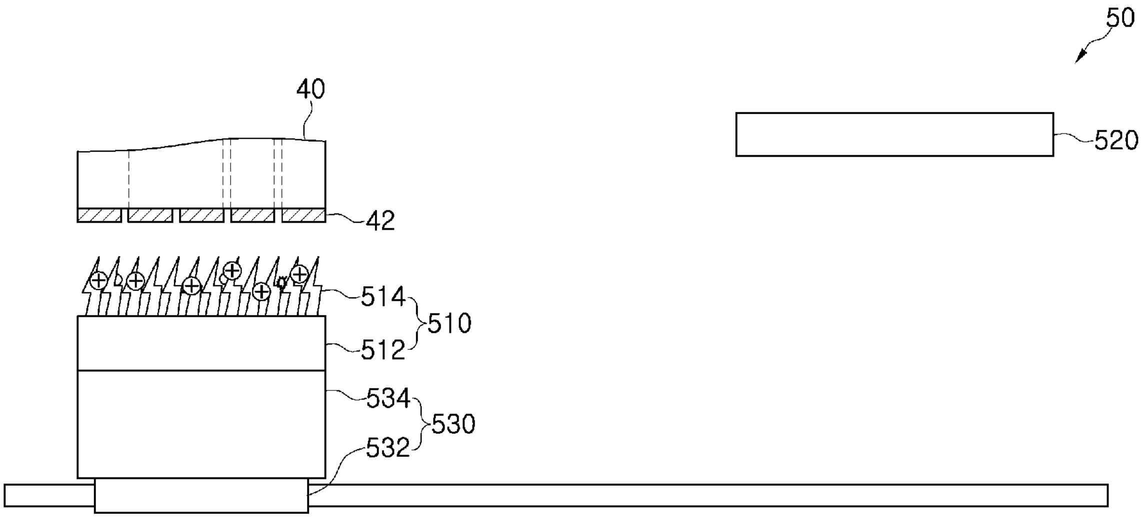

When cleaning of the nozzle 42 of the inkjet head 40 is completed, the cleaning member 510 descends and is positioned at the initial position as shown in FIG. 8. Thereafter, the cleaning member 510 may repeat the above-described cleaning process.

Figure 11:
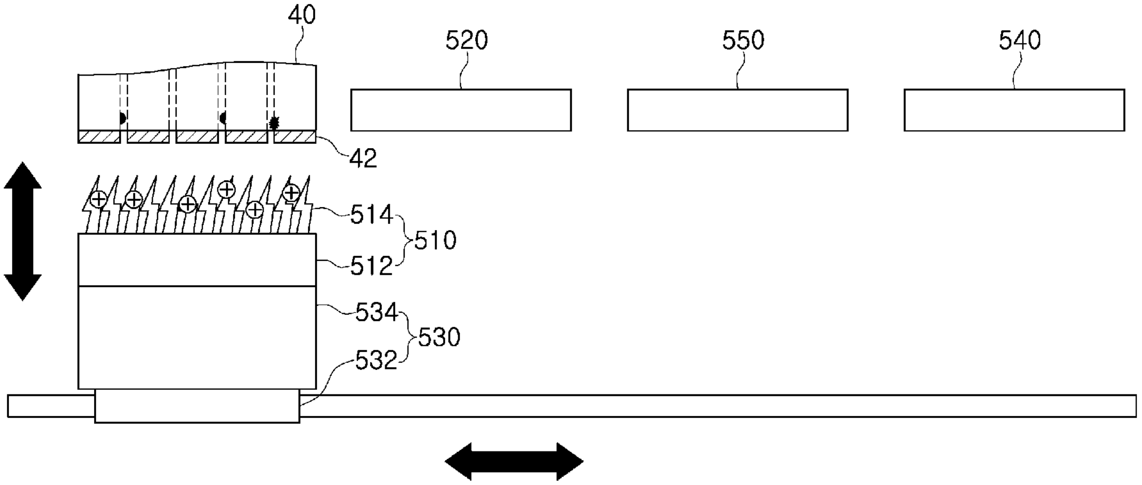
FIG. 11 shows a schematic structure of an inkjet head cleaning apparatus according to an embodiment of the present disclosure.

FIG. 11 shows a schematic structure of an inkjet head cleaning apparatus 50 according to an embodiment of the present disclosure.

The inkjet head cleaning apparatus 50 according to an embodiment of the present disclosure include: a body part 512 having a shape corresponding to an inkjet head 40 in which a nozzle 42 for discharging a liquid is formed; a brush part 514 formed on one surface of the body part 512 and inserted into the nozzle 42 to remove foreign substances; a brush cleaning unit 540 that cleans the brush part 514 using a cleaning solution; a brush drying unit 550 for drying the cleaning solution remaining in the brush part 514; and a drive unit 530 for lifting and lowering the body part 512 so that the dried brush part 514 is inserted into the nozzle 42. In addition, a surface treatment unit 520 for controlling the surface polarity of the brush part 514 by charging ions on the surface of the brush part 514 may be provided.

According to the embodiment, after the cleaning member 510 cleans the inkjet head 40, foreign substances adhering to the cleaning member 510 are removed by the brush cleaning unit 540, and the cleaning solution remaining in the cleaning member 510 may be removed by the brush drying unit 550.

According to the embodiment of the present disclosure, the brush cleaning unit 540 may supply the cleaning solution toward the brush part 514 to clean the brush part 514. For example, the brush cleaning unit 540 may include a separate cleaning solution discharge nozzle to discharge the cleaning solution to the brush part 514, and foreign substances adhering to the brush part 514 may be removed by the cleaning solution.

Figure 19:
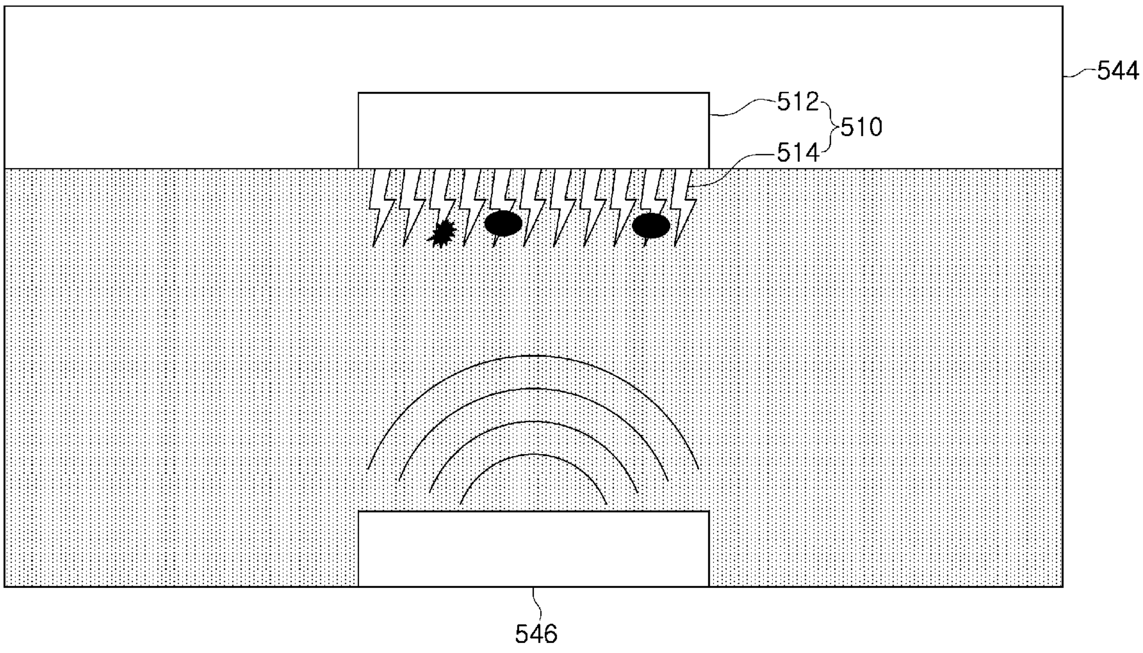
FIG. 19 shows an embodiment of a brush cleaning unit according to the present disclosure.

In an embodiment, the brush cleaning unit 540 may be configured to apply vibration energy such as ultrasonic waves while the cleaning member 510 is immersed in the cleaning solution. For example, as in FIG. 19, the brush cleaning unit 540 may include: a storage container 544 in which the cleaning solution is stored; and a vibration generating part 546 that applies vibration energy to the cleaning solution stored in the storage container 544. According to the embodiment, foreign substances remaining in the brush part 514 of the cleaning member 510 may be removed from the cleaning member 510 by combining with the cleaning solution and by a physical force additionally applied thereto. Although not specifically shown, a driving device (e.g., a flipper) for immersing the cleaning member 510 in the cleaning solution may be provided in the inkjet head cleaning apparatus 50.

The brush drying unit 550 may be provided for drying the cleaning solution remaining in the brush part 514 after the cleaning member 510 is cleaned using the cleaning solution. The brush drying unit 550 according to the embodiment of the present disclosure may spray air toward the cleaning member 510 to remove the cleaning solution remaining in the brush part 514. The brush drying unit 550 may include a slit-type air spraying device, and may include a heater to spray high temperature air to the cleaning member 510 in order to increase drying efficiency.

Figure 12:
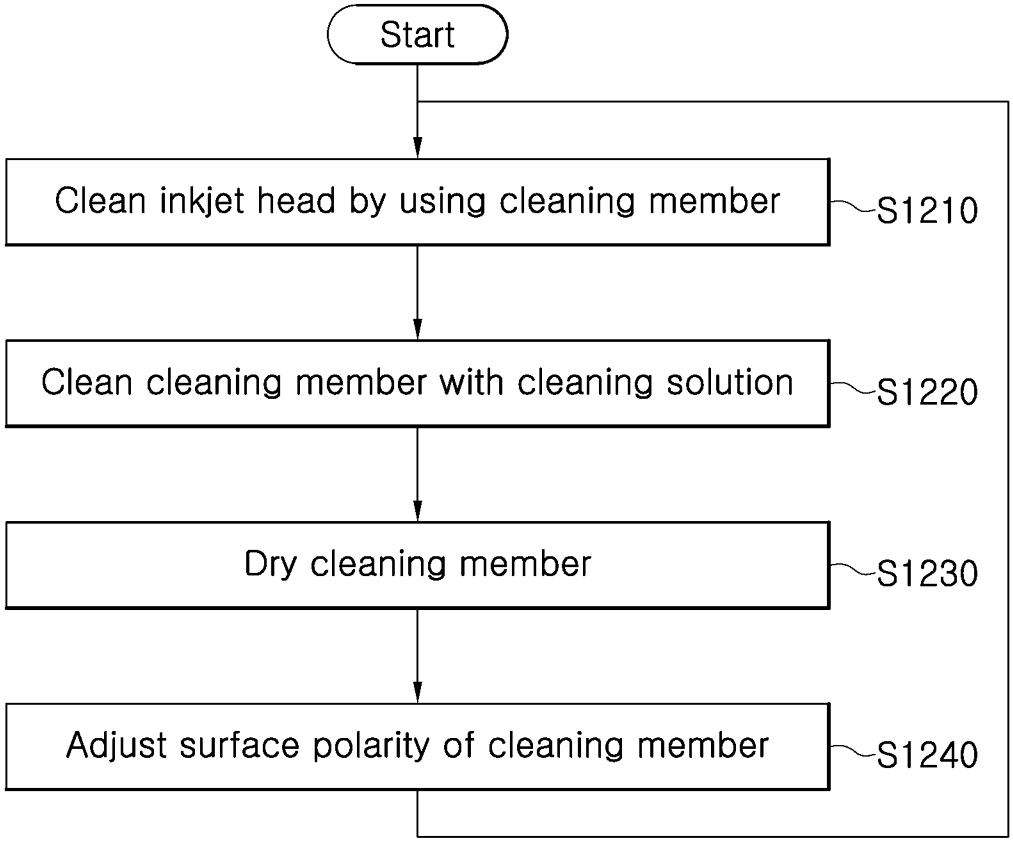
FIG. 12 is a flowchart illustrating an operation for cleaning an inkjet head according to an embodiment of the present disclosure.

FIG. 12 is a flowchart illustrating an operation for cleaning an inkjet head according to an embodiment of the present disclosure. A method for cleaning an inkjet head according to the present embodiment include: cleaning 51210 the inkjet head using the cleaning member 510; cleaning 51220 the cleaning member 510 using the cleaning solution; drying 51230 the cleaning member 510; and adjusting 51240 the surface polarity of the cleaning member 510 using the surface treatment unit 520.

Figure 13:
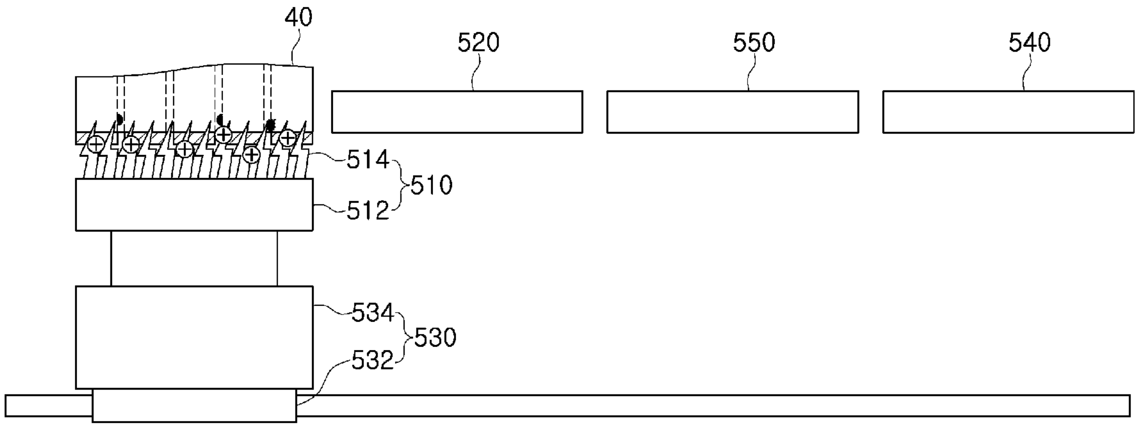
FIGS. 13 to 18 schematically show a cleaning operation by the inkjet head cleaning apparatus according to an embodiment of the present disclosure.
Figure 14:
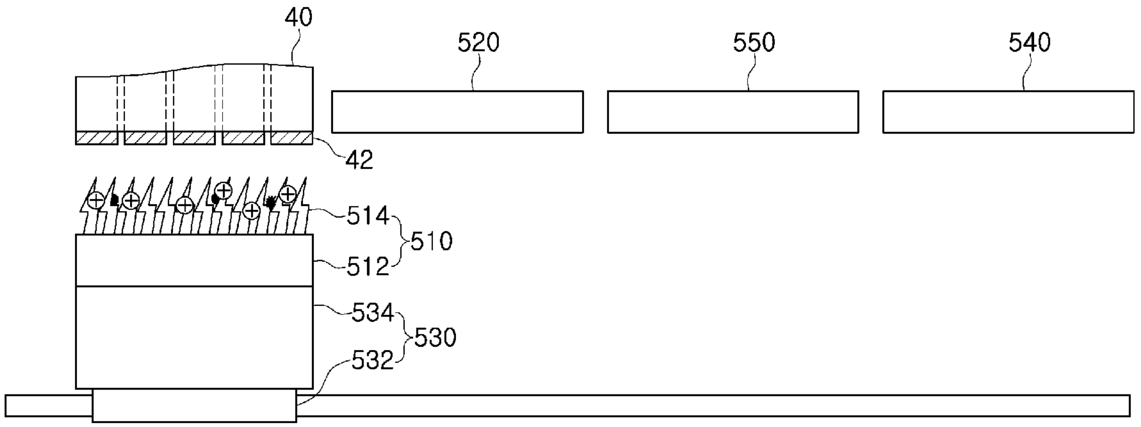
Figure 15:
Figure 16:
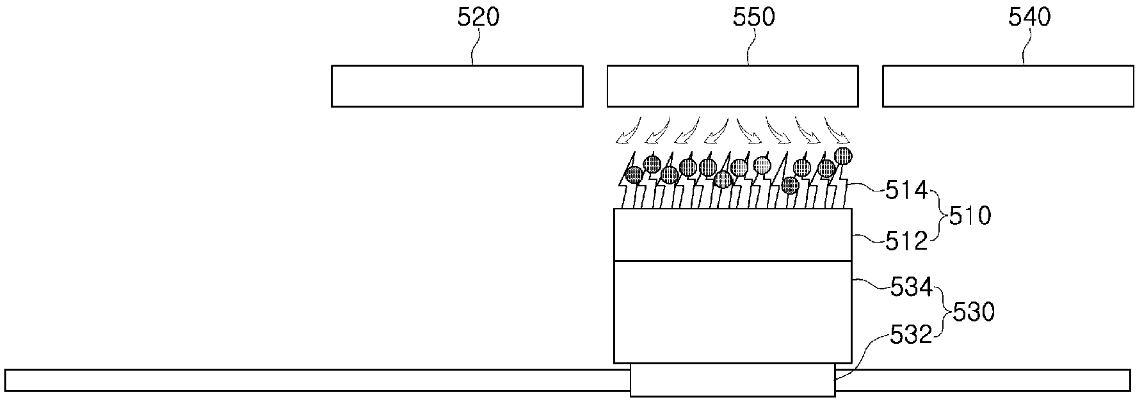

First, as in FIGS. 13 and 14, cleaning of the inkjet head 40 is carried out using the cleaning member 510, and then as in FIG. 15, the cleaning member 510 moves toward the brush cleaning unit 540 by the horizontal drive unit 532, and the brush cleaning unit 540 supplies a cleaning solution to the brush part 514 to remove foreign substances attached to the brush part 514. After that, as shown in FIG. 16, the cleaning member 510 is moved toward the brush drying unit 550 by the horizontal drive unit 532, and the brush drying unit 550 blows air to the brush part 514 to remove the cleaning solution remaining in the cleaning member 510 to dry the cleaning member 510.

Figure 17:
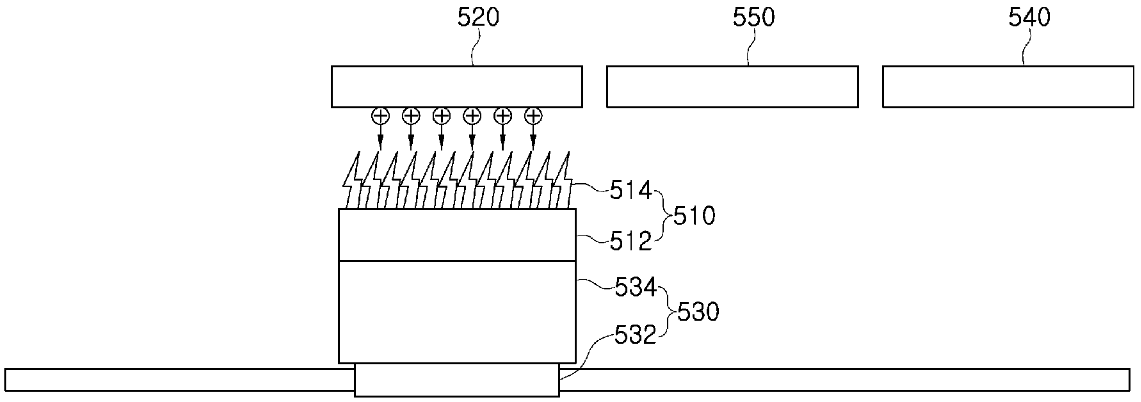

As in FIG. 17, when cleaning of the inkjet head 40 is required, the cleaning member 510 is moved toward the surface treatment unit 520 by the horizontal drive unit 532, and the surface treatment unit 520 charges ions on the surface of the brush part 514 through plasma treatment and adjusts the surface polarity of the brush part 514 to be hydrophilic. The surface polarity of the cleaning member 510 may be adjusted according to the degree of contamination of the inkjet head 40 or the operating time of the inkjet head 40, which may be determined by experimental data.

Figure 20:
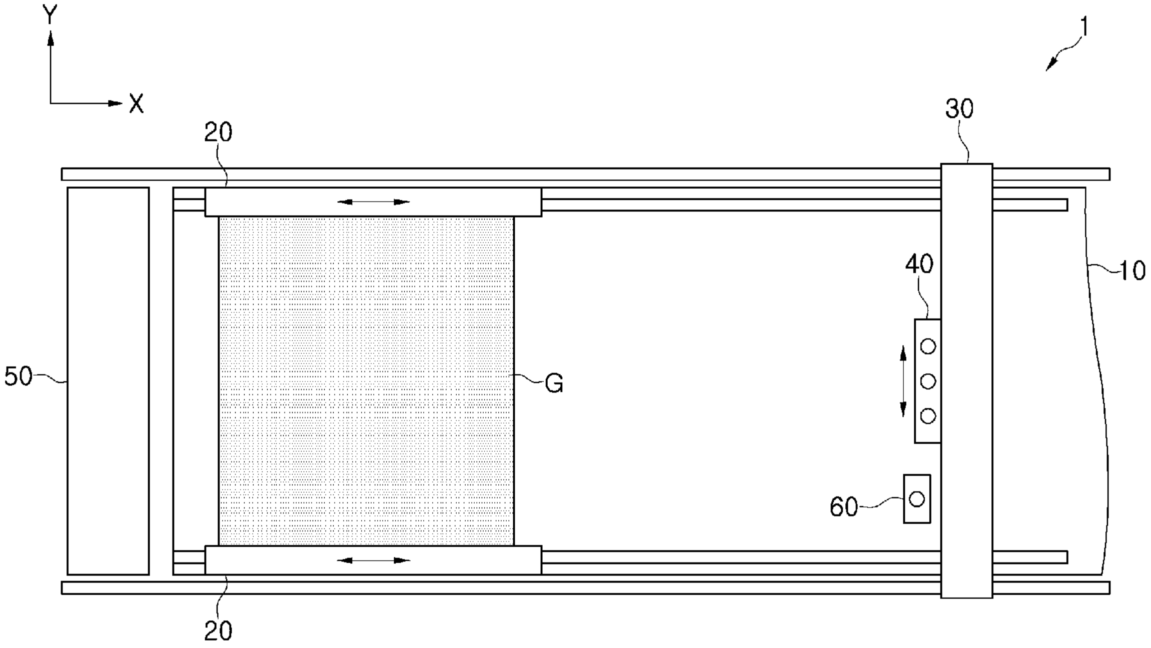
FIG. 20 shows a schematic structure of inkjet printing equipment according to yet an embodiment of the present disclosure.

Meanwhile, a head inspection unit 60 capable of measuring the degree of contamination of the inkjet head 40 may be provided to measure the state of the inkjet head 40. For example, as shown in FIG. 20, the head inspection unit 60 capable of inspecting the inkjet head 40 may be provided on the stage 10 to inspect the state of the nozzle 42 of the inkjet head 40. As shown in FIG. 21, the head inspection unit 60 is provided so as to inspect how much foreign substances are present in the nozzle 42 of the inkjet head 40 by photographing the inkjet head 40 from below. When foreign substances are present in the inkjet head 40 more than a reference value, the inkjet head 40 may be controlled to be cleaned by the aforementioned inkjet head cleaning apparatus 50.

The surface treatment unit 520 may adjust the amount of electric charge applied to the cleaning member 510 according to the degree of contamination of the nozzle 42 provided from the head inspection unit 60. For example, when it is confirmed that more foreign substances exist in the nozzle 42 than the reference value, the surface treatment unit 520 may apply plasma to the cleaning member 510 at a value higher than or equal to a normal value.

Figure 22:
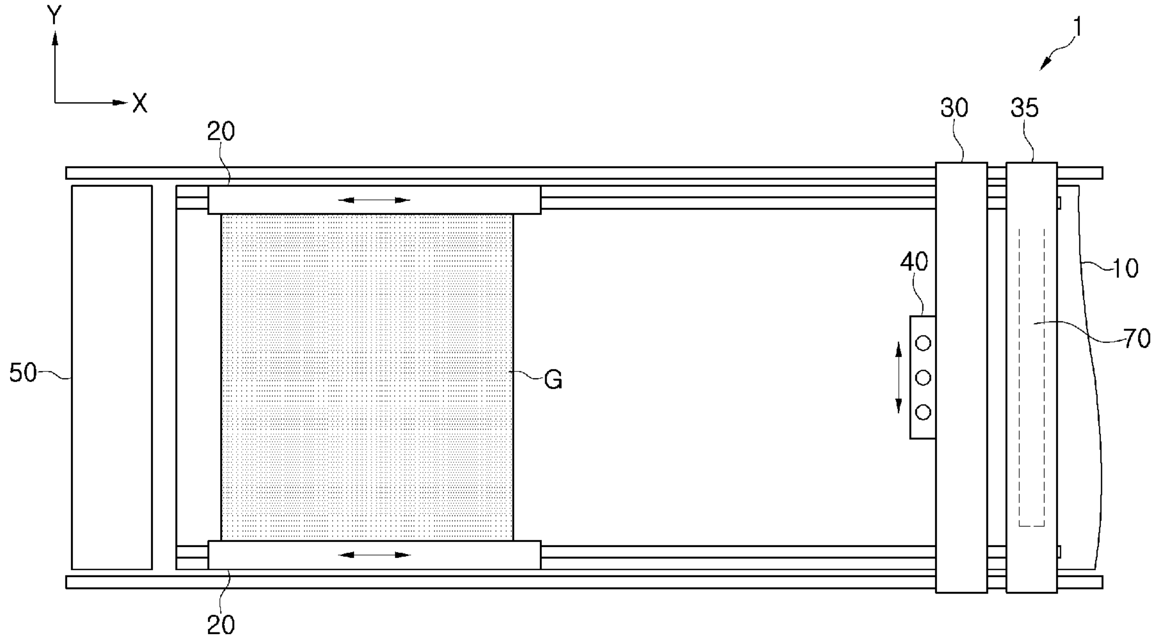
FIG. 22 shows a schematic structure of inkjet printing equipment according to an embodiment of the present disclosure.
Figure 23:
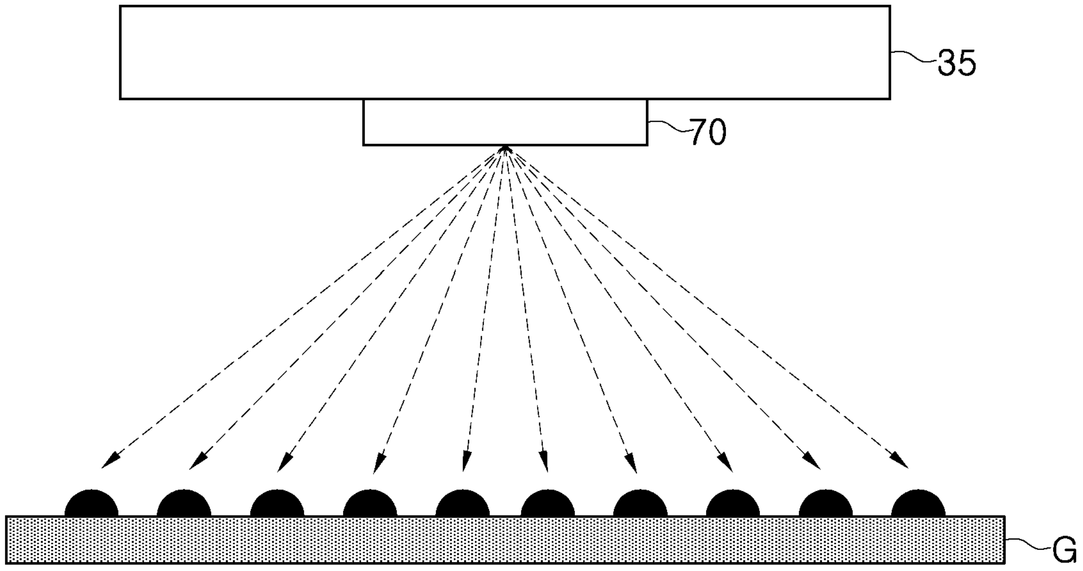
FIG. 23 shows an example of a method for inspecting droplets discarded on a substrate.

In addition, a droplet inspection unit 70 for inspecting droplets ejected by the inkjet head 40 may be provided to inspect whether there is an abnormality in the inkjet head 40. For example, as shown in FIG. 22, the droplet inspection unit 70 may be provided on a separate gantry 35 to inspect the droplets ejected by the inkjet head 40. For example, as shown in FIG. 23, the droplet inspection unit 70 may be positioned at the top and inspect whether the droplets are normally discharged by photographing the droplets discharged on the substrate G. When there is an abnormally discharged droplet, it means that there is an abnormality in the inkjet head 40 or foreign substances exist in the inkjet head 40, and thus the inkjet head 40 may be controlled to be cleaned by the aforementioned inkjet head cleaning apparatus 50.

The surface treatment unit 520 may adjust the amount of electric charge applied to the cleaning member 510 according to the degree of contamination of the nozzle 42 provided from the droplet inspection unit 70. For example, when it is confirmed that more foreign substances exist in the nozzle 42 than the reference value, the surface treatment unit 520 may apply plasma to the cleaning member 510 at a value higher than or equal to a normal value.

Figure 18:
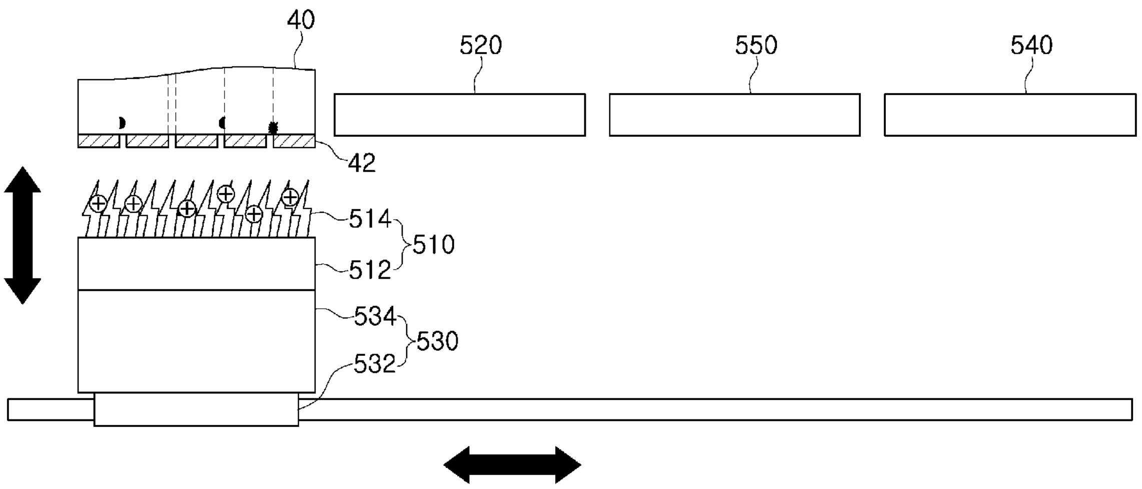

After that, as in FIG. 18, the cleaning member 510 moves to be located under the inkjet head 40 by the horizontal drive unit 532, and by the vertical drive unit 534, the microstructures of the brush part 514 of the cleaning member 510 penetrate inside of the nozzle 42 to remove foreign substances inside the nozzle 42.

Thereafter, a similar operation may be repeatedly performed with respect to the other inkjet head 40, and some processes may be omitted if necessary.

As previously described, according to the embodiments of the present disclosure, it is possible to variably control the surface charge characteristics of the cleaning member 510 having microstructures, and effectively remove foreign substances remaining in the inkjet head 40 at a low cost as the cleaning member 510 is inserted into the nozzle 42 to clean the inkjet head 40. Thus, the overall performance of the inkjet printing equipment 1 may be improved by maintaining the performance of the inkjet head 40 constant.

The embodiments and the accompanying drawings in this specification only clearly show a part of the technical idea included in the present disclosure, and thus it will be apparent that all modifications and specific embodiments that can be easily inferred by those skilled in the art within the scope of the technical idea included in the specification and drawings of the present disclosure are included in the scope of the present disclosure.

Therefore, the spirit of the present disclosure should not be limited to the described embodiments, and not only the claims to be described later, but also all equivalents or equivalent modifications to the claims should be construed as being included in the scope of the spirit of the present disclosure.

What is claimed is:

1. A nozzle cleaning apparatus, comprising:
a body part;
a brush part formed on a first surface of the body part and having a size such that the brush part is inserted into a nozzle to remove foreign substances; and
a drive unit for lifting the body part so that the brush part is inserted into the nozzle.

2. The nozzle cleaning apparatus of claim 1,
wherein the brush part is composed of a plurality of microstructures,
wherein an area of the microstructure is smaller than a surface area of the nozzle, and
wherein a height of the microstructure is greater than a height of the nozzle.

3. The nozzle cleaning apparatus of claim 1, further comprising:
a surface treatment unit for changing a surface polarity of the brush part to be hydrophilic by charging ions on a surface of the brush part.

4. The nozzle cleaning apparatus of claim 3,
wherein the surface treatment unit includes:
a plasma treatment part that applies plasma to the brush part;
a power supply source that supplies power for generating the plasma; and
an energy control unit that controls plasma energy applied to the brush part.

5. The nozzle cleaning apparatus of claim 3,
wherein the drive unit includes:
a horizontal drive unit for moving the body part between the surface treatment unit and the nozzle; and
a vertical drive unit for lifting the body part so that the brush part is inserted into an end inside of the nozzle.

6. An inkjet head cleaning apparatus, comprising:
a body part having a shape corresponding to an inkjet head in which a nozzle for discharging a liquid is formed;
a brush part formed on a first surface of the body part and having a size such that the brush part is inserted into the nozzle to remove foreign substances;
a brush cleaning unit that cleans the brush part using a cleaning solution;
a brush drying unit for drying the cleaning solution remaining on the brush part; and a drive unit for lifting the body part so that the dried brush part is inserted into the nozzle.

7. The inkjet head cleaning apparatus of claim 6, wherein the brush cleaning unit supplies the cleaning solution toward the brush part to clean the brush part.

8. The inkjet head cleaning apparatus of claim 6, wherein the brush cleaning unit includes:

a storage container in which the cleaning solution is stored; and a vibration generating part that applies vibration energy to the cleaning solution stored in the storage container.

9. The inkjet head cleaning apparatus of claim 6, wherein the brush drying unit sprays air toward the brush part to remove the cleaning solution remaining in the brush part.

10. The inkjet head cleaning apparatus of claim 6, further comprising:

a surface treatment unit for changing a surface polarity of the brush part to be hydrophilic by charging ions on a surface of the dried brush part.

11. The inkjet head cleaning apparatus of claim 10, wherein the surface treatment unit includes:

a plasma treatment part that applies plasma to the brush part;

a power supply source that supplies power for generating the plasma; and an energy control unit that controls plasma energy applied to the brush part.

12. Inkjet printing equipment, comprising:

a stage that forms a space where a substrate is treated;

a gripper positioned on a side of the stage and configured to move in a first direction while gripping the side of the substrate;

a gantry provided on an upper part of the stage;

an inkjet head caused to move in a second direction perpendicular to the first direction in the gantry and discharging droplets toward the substrate; and an inkjet head cleaning apparatus positioned at a first side of the stage to clean the inkjet head, wherein the inkjet head cleaning apparatus includes:

a body part having a shape corresponding to the inkjet head;

a brush part formed on a first surface of the body part and having a size such that the brush part is inserted into a nozzle to remove foreign substances;

a brush cleaning unit that cleans the brush part using a cleaning solution; and a drive unit for lifting the body part so that the brush part is inserted into the nozzle.

13. The inkjet printing equipment of claim 12, wherein the inkjet head cleaning apparatus further comprises:

a surface treatment unit for changing a surface polarity of the brush part to be hydrophilic by charging ions on a surface of the brush part, wherein the surface treatment unit includes:

a plasma treatment part that applies plasma to the brush part;

a power supply source that supplies power for generating the plasma; and an energy control unit that controls plasma energy applied to the brush part.

14. The inkjet printing equipment of claim 13, further comprising:

a head inspection unit for inspecting a state of the nozzle of the inkjet head, wherein the surface treatment unit adjusts an amount of electric charge applied to the brush part according to a degree of contamination of the nozzle provided by the head inspection unit.

15. The inkjet printing equipment of claim 13, further comprising:

a droplet inspection unit for inspecting a state of a droplet discharged by the inkjet head, wherein the surface treatment unit adjusts an amount of electric charge applied to the brush part according to a discharge state of the droplet provided by the droplet inspection unit.

16. The inkjet printing equipment of claim 12, wherein the inkjet head cleaning apparatus further includes:

a brush drying unit that sprays air toward the brush part to remove the cleaning solution remaining in the brush part.

17. A method for cleaning an inkjet head, the method comprising:

adjusting a surface polarity of a brush part of a cleaning member;

moving the cleaning member to be located under the inkjet head;

lifting the cleaning member so that the brush part of the cleaning member is inserted into a nozzle of the inkjet head; and lowering the cleaning member in response to cleaning of the inkjet head being completed.

18. The method for cleaning an inkjet head of claim 17, wherein the adjusting of the surface polarity of the brush part includes:

charging ions to the brush part through plasma treatment.

19. The method for cleaning an inkjet head of claim 17, wherein the adjusting of the surface polarity of the brush part includes:

monitoring a contamination state of the inkjet head; and adjusting the surface polarity of the brush part to be hydrophilic based on the contamination state of the inkjet head.

20. The method for cleaning an inkjet head of claim 19, wherein the contamination state indicates that an amount of foreign substances present in the inkjet head exceeds a reference value.

* * * * *